United States Patent Office 3,338,961
Patented Aug. 29, 1967

3,338,961
PROMOTED CATALYTIC CARBONYLATION OF ALLYLIC HALIDES
Rex D. Closson and Kryn G. Ihrman, Royal Oak, and Allen H. Filbey, Walled Lake, Mich., assignors to Ethyl Corporation, New York, N.Y., a corporation of Virginia
No Drawing. Filed Jan. 30, 1964, Ser. No. 341,429
5 Claims. (Cl. 260—544)

This invention relates to a novel process for the preparation of unsaturated carboxylic acid halides and related compounds. More specifically, it relates to a catalytic process for the preparation of acid halides from allylic halides and carbon monoxide. The catalysts employed in this process are palladium, rhodium, and compounds of those metals.

An object of this invention is to prepare bifunctional compounds. Another object is to provide a process for the preparation of acyl halides and related compounds. A particular object is to provide a catalytic process for the preparation of unsaturated carboxylic acid halides. Additional objects will be apparent from the following detailed description and appended claims.

The objects of this invention are accomplished by providing a process which comprises reacting an allylic halide with carbon monoxide in the presence of a catalytic amount of palladium, rhodium, compounds of palladium, or compounds of rhodium. A preferred embodiment of this invention comprises a catalytic process for the preparation of unsaturated carboxylic acid halides and related compounds, which comprises reacting an allylic halide having up to about 20 carbon atoms with carbon monoxide, in the presence of a catalytic quantity of a catalyst selected from the class consisting of palladium metal, rhodium metal, chelates and inorganic salts of said metals.

An outstanding feature of this process is the products produced thereby. The products contain an olefinic double bond and an acyl halide radical. Both of these functional groups are highly reactive and capable of a wide variety of chemical reactions. The technical importance of bifunctional compounds of this type maintains a continuing interest in new and improved methods for their preparation.

The process of this invention is characterized by its decided economical advantages and its simplicity. The reactants are inexpensive and readily obtainable. Furthermore, the catalysts employed are stable and relatively non-toxic; hence, they can be stored and used without elaborate safety precautions. Moreover, the process is readily carried out in standard reaction vessels.

An important aspect of this invention is that it requires considerably less than a molar equivalent quantity of catalyst. Moreover, the catalytic activity is not destroyed by the process; therefore, the catalysts are reusable. The catalysts are solids and can be dispersed on an inert matrix. Thus, the process can be carried out as a continuous flow operation.

An unsaturated carboxylic acid halide is prepared by the process. Depending on the isolation procedure employed, the acid halide or derivatives thereof are obtained. For example, if the reaction mixture containing the acid halide is treated with water or alcohol, the corresponding carboxylic acid or an ester thereof is prepared. Amides are obtained by treating the reaction mixture containing the acid halide with ammonia. Other procedures for modifying the acid halides are apparent to one skilled in the art.

Hence, this invention comprises: in a process for the preparation of unsaturated carboxylic acids, carboxylic acid halides, esters, amides, and the like, the step comprising reacting an allylic halide with carbon monoxide, in the presence of a palladium or rhodium catalyst. This step can be illustrated by the following equation wherein the allylic halide is allyl chloride and [cat.] represents a catalytic amount of a material selected from the class consisting of palladium, rhodium, palladium chelates, rhodium chelates, palladium salts, and rhodium salts.

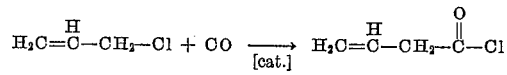

As illustrated by the equation, one molecule of carbon monoxide is inserted into each allylic halide group reacted. Although the process can be carried out by contacting the reactants in this ratio, it is not necessary to do so. Frequently, it is desirable to employ an excess of either reactant. For example, an excess of allylic halide can be employed and the excess used as a solvent and/or dispersing medium. The amount of excess is not critical and is governed to some extent by the cost of the halide, the solubility of carbon monoxide therein, equipment design, and ease of separation of the desired products. Thus, up to 30 or 40 or more moles of allylic halide per mole of carbon monoxide can be employed, if desired.

An excess of carbon monoxide frequently increases the yield. Consequently, it is frequently desirable to employ from about 1.5 to about 25 or more moles of carbon monoxide per each mole of allylic halide group to be reacted. A preferred excess is from about 2 to about 15 moles, and a most preferred ratio from about 3 to about 12 moles of carbon monoxide per each mole of allylic halide group. Thus, if the allylic halide contains one allyl halide radical, a preferred ratio is from about 3 to about 15 moles of carbon monoxide per mole of allylic halide. Similarly, if the allylic halide contains two allyl halide radicals, a preferred range is from about 6 to about 30 moles of carbon monoxide per each mole of allylic halide.

The process can be carried out in the presence of inert ingredients. For example, it can be carried out in the presence of a solvent and/or dispersing medium which does not enter into the reaction. Preferably, the solvent-dispersing medium is an inert organic liquid such as a hydrocarbon or mixture thereof. Hydrocarbons which can be employed can be either aliphatic, alicyclic or aromatic. Typical applicable hydrocarbon solvent-dispersing media are cyclohexane, benzene, toluene, isooctane, No. 9 oil, kerosene, petroleum ether, and the like.

Compounds which contain active hydrogens, e.g., acids, alcohols, water, and the like, interfere with the preparation of acid halides by this process. Therefore, when reacting carbon monoxide with an allylic halide, the total concentration of compounds which contain an active hydrogen should not exceed about 0.1% by weight. Preferably, the concentration of compounds containing active hydrogens should be less than about 0.05%, and most preferably, below 0.001%. Thus, the preparation of acid halides according to the process of this invention is carried out in the substantial absence of active hydrogen compounds, i.e., under "anhydrogenic" conditions.

A temperature which affords a reasonable reaction time and which does not cause an excessive decomposition of the products or reactants is preferred. In many instances, best results are obtained when a temperature within the range of from about 85° C. to about 300° C. is employed. A preferred temperature range is from about 90° C. to about 190° C. and a highly preferred range is from about 100° C. to about 150° C. To some extent, the reaction temperature influences the type of product obtained. Thus, in many instances, if an allylic halide is reacted at a comparatively low temperature, i.e., from about 85° to about 150° C., the predominant product is a vinylacetyl halide. If the reaction is carried out at a temperature from about 150° C. to about 300° C., the product in many instances is predominantly a crotonoyl halide. In most instances (and especially at temperatures within the range of from about 120° to about 170° C.) the product is a mixture of the corresponding vinylacetyl halide and crotonoyl halide. The migration of the double bond to form a crotonoyl halide is usually enhanced by longer reaction times.

The process of this invention can be carried out under atmospheric, subatmospheric, or superatmospheric pressures. A readily obtainable pressure which affords a reasonable yield of product in a comparatively short reaction time is preferred. In many instances, best results are obtained when the reaction is carried out at superatmospheric pressures within the range of from about 50 p.s.i. to about 10,000 p.s.i. A preferred pressure range is from about 500 p.s.i. to about 5,000 p.s.i.; and a highly preferred range is from about 1,000 p.s.i. to about 3,000 p.s.i.

The reaction time is not a truly independent variable and is dependent to some extent on the nature of the allylic halide reacted and the other process variables under which the reaction is conducted. For example, when high temperatures and high pressures are employed, the reaction time is usually reduced. Similarly, low temperatures and low pressures usually require a longer reaction time. In most instances, the reaction is complete within from about two to about 48 hours. If temperatures of above about 150° C. are employed, and a vinylacetyl halide is desired, it is frequently desirable to employ a reaction time of less than about three hours.

When the reaction is carried out in the presence of a liquid phase, agitation of the reaction mixture is efficaciously employed. Although not essential, efficient agitation usually affords a smooth reaction rate and tends to decrease the reaction time. For best results, when the process is carried out in the vapor phase, the catalyst (preferably in a fine state of subdivision) is dispersed on an inert matrix.

The catalyst employed in the process of this invention can be palladium, rhodium, or a chelate or a salt of these metals. It is preferred that the catalyst be in a fine state of subdivision. Metal turnings and finely divided metal powders can be employed. Colloidal dispersions of palladium and rhodium in an inert solvent are also applicable. Similarly, the metals can be dispersed and supported on an inert solid matrix such as charcoal, alumina, diatomaceous earth, bentonite, firebrick, kaolin, ground glass, silicon carbide, and the like. Mixtures or alloys of the metals in any of the forms described above can be employed, if desired.

Any salt of palladium or rhodium, having an anion which is non-reactive under the reaction conditions employed and which does not unduly retard the formation of the acid halide product by an extraneous side reaction, is a suitable catalyst. Applicable catalytic salts include inorganic and organic salts. Salts of fatty acids having up to about four carbon atoms are preferred organic salts. Highly preferred salts of this type are palladium and rhodium acetate. Inorganic salts and especially simple inorganic salts constitute a highly preferred class of catalytic salts. Salts of this type are readily available and comparatively inexpensive. Illustrative but non-limiting examples of simple inorganic salts which can be employed are the palladium and rhodium halides such as palladium (II) chloride, palladium (II) bromide, rhodium (III) chloride, rhodium (III) bromide, and the like.

A wide variety of palladium and rhodium chelates are applicable in the instant process. Preferred chelates have a donor atom selected from the class consisting of Group V and Group VIB elements. More preferred chelating agents have a donor atom selected from the class consisting of nitrogen and oxygen. Triamines, tetraamines, and oximes comprise a preferred class of chelating agents having nitrogen as a donor atom. Dibasic carboxylic acids comprise a preferred class of chelating agents having oxygen as a donor atom. Thus, chelates derived from well-known chelating agents such as salicylic acid, α-acyloin oxime, α-benzoin oxime, dimethylglyoxime, acetylacetone, aminoacetic acid, oxalic acid, diethylenetriamine, triethylenetetraamine, malonic acid, and the like can be employed. Illustrative but non-limiting examples of applicable chelates include $K_2Pd^{II}(C_2O_4) \cdot 2H_2O$, $Na_3[Rh(C_2O_4)_3] \cdot 6H_2O$, $K_3[Rh(malonato)_3] \cdot 5H_2O$, tris (ethylenediamine) rhodium$^{III}$, palladium (II) dimethylglyoximate, and the like. Hydrated chelates illustrated above are usually employed in such amount that the water of hydration does not exceed about 0.1% by weight of the total reaction mixture.

The palladium catalysts described and illustrated above are, in general, more reactive than those of rhodium and, therefore, are preferred. More preferably, the catalyst is selected from the class consisting of palladium metal and simple inorganic palladium salts. Highly preferred catalysts are palladium, palladium chloride, and palladium bromide. The most preferred catalyst is palladium chloride.

The reaction is carried out in the presence of a catalytic amount of one or more of the above catalysts which is usually up to about 20 mole percent. Amounts as low as 0.0001 mole percent can be employed, but usually amounts in the range of 0.01 to 5 mole percent are used.

A wide variety of allylic halides can react with carbon monoxide according to the process of this invention. Thus, any allylic halide which (1) is stable under the reaction conditions employed, (2) contains a free allylic halide radical,

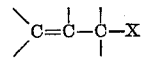

(X=halogen) as a reactive group, and (3) does not contain substituent groups which hinder or retard the process of this invention by undergoing competitive side reactions, are applicable. A free allylic halide radical is not in such juxtaposition with other radicals or groups that it is incapable of reacting as an allylic group because of a perturbation of its electronic structure by the neighboring radicals or groups.

Preferred allylic halides which meet the above criteria have the formula:

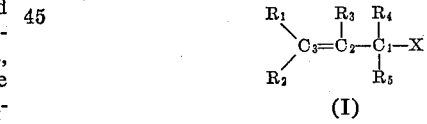

(I)

wherein X is a halogen, preferably chlorine or bromine, and $R_1$, $R_2$, $R_3$, $R_4$, and $R_5$ are independently selected from the class consisting of hydrogen and univalent organic radicals selected from the class consisting of alkyl, cycloalkyl, aralkyl, alkenyl, aryl, and alkaryl radicals having up to about 13 carbon atoms, such that the number of carbon atoms in said allylic halide does not exceed about 20.

Allylic halides having up to about 20 carbon atoms are preferred since, in general, they are more readily available. However, it is clear that no exact critical limitation of the number of carbon atoms exists. Consequently, allylic halides having more than 20 carbons, say 30 or more, can be employed in the process.

To some extent, the position of substitution on the allylic carbon atoms influences the type of acyl halide obtained. Specifically, the position of substitution will determine if the carbonyl halide radical

is bonded to carbon atom $C_1$, $C_2$, or $C_3$ in Formula I. In practice, mixtures of $C_1$- and $C_3$-acyl halide-substituted products, are most frequently obtained. Most of these mixtures have a predominant amount of one product or the other. Most often, the predominant product has the carbonyl halide radical bonded to the least substituted of carbon atoms $C_1$ and $C_3$.

Thus, if 1-methylallyl chloride ($R_1$, $R_2$, $R_3$, and $R_5$ are hydrogen) is reacted according to this process, at a comparatively low temperature and for a comparatively short reaction time, to minimize the migration of the double bond, the predominant product is

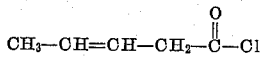

The identical product predominates when 3-methylallyl chloride ($R_2$, $R_3$, $R_4$ and $R_5$=hydrogen) is reacted under similar conditions.

When 2-methylallyl chloride is reacted under similar conditions, the product is

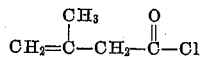

This product is obtained if carbon atoms $C_1$ or $C_3$ in the starting material is substituted with the carbonyl halide radical. Hence, the radical $R_3$ in Formula I usually does not have any directive properties. Thus, 1,2-dimethylallyl chloride and 2,3-dimethylallyl chloride yield the same product.

Two allylic halides, wherein $R_1$ and $R_2$ in one of them are identical to $R_4$ and $R_5$ in the other, yield the same predominant product. Thus, 1,1-dimethylallyl chloride and 3,3-dimethylallyl chloride can be reacted to yield the identical predominant product. If an allylic halide has the same number of organic radicals bonded to carbon atom $C_1$ as are bonded to carbon atom $C_3$, but the substituents are not identical, the predominant product usually will have the carbonyl halide radical bonded to the carbon atom which is the least sterically hindered. Thus, if 1-phenyl-3-methylallyl chloride is reacted according to this process under conditions in which the migration of the double bond is minimized, the predominant product is

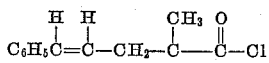

This illustrates that the directive influences of groups such as the phenyl (or tert-butyl or cyclohexyl radical) is much greater than a methyl radical (or a primary alkyl radical). The directive influence of different primary alkyl radicals (and different secondary alkyl radicals) is approximately the same. Thus, for example, an allylic halide wherein $R_1$ is n-butyl and $R_4$ is ethyl ($R_2$ and $R_5$ being identical), in most instances, yields an approximately equimolar mixture of acyl halides having the carbonyl halide radical bonded to carbon atom $C_1$ in one of them and carbon atom $C_3$ in the other.

Alkyl substituted allylic halides having Formula I are illustrated by 1-methylallyl chloride ($R_4$ is a methyl radical), 1,1-dimethylallyl chloride, 2-methylallyl chloride ($R_3$ is a methyl radical), 1,2-dimethylallyl chloride, 1,1,2-trimethylallylallyl chloride, 3-methylallyl chloride ($R_1$ is a methyl radical), 3,3-dimethylallyl bromide, 1,2,3-trimethylallyl bromide, 2,3-dimethylallyl-bromide, 2,3,3-trimethylallyl bromide, 1,1,2,3,3-pentamethylallyl bromide, and the like.

Allylic halides which are substituted with other alkyl radicals also form the corresponding acyl halides when reacted according to the process of this invention. Typical allylic halides which may be employed in this process are 1-ethylallyl chloride, 2-propylallyl chloride, 3-tert-butylallyl chloride, 3,3-dipentylallyl chloride, 2,-ethyl-1-methylallyl chloride, 1,1-dihexylallyl bromide, 1,2,3-triheptylallyl bromide, 3,3-diisopropylallyl bromide, 3,3-diamyl-1-methylallyl chloride, 1,1,2,3,3-pentaethylallyl bromide, 1-propyl-2-ethyl-3,3-dihexylallyl bromide, 3-tridecylallyl chloride, 2-dodecylallyl chloride, 1-dodecyl-3,3-dipropylallyl chloride, 3-dodecyl-2-pentylallyl bromide, and the like. The above compounds illustrate that the substituents within the applicable allyl halides may have either a straight or branched chain.

Allylic halides that are substituted with cycloalkyl radicals are applicable. For example, when one mole of 3-cyclohexylallyl chloride in benzene is reacted with carbon monoxide at 150° C. under a pressure of 500 p.s.i. in the presence of a catalytic amount of two percent palladium on charcoal, the product is a mixture of 3-cyclohexylvinylacetyl chloride and 3-cyclohexylcrotonoyl chloride. In a similar manner, 2-cyclohexylallyl chloride, 1-cyclohexylallyl bromide, 1,1-dicyclohexylallyl bromide, 1,2,3-tricyclohexylallyl chloride, 3-cyclopentylallyl chloride, 2-cyclopentylallyl bromide, and the like, react according to this process to yield the corresponding acyl halides.

The allylic halides employed in this process may be substituted with an aralkyl radical. As an example, 2-phenylethylallyl chloride in ligroin reacts at 120° C. with carbon monoxide at a pressure of 1,000 p.s.i. and in the presence of a catalytic amount of palladium powder to yield a mixture of 2-[2-phenyl]ethylvinylacetyl chloride and 2-[2-phenyl]ethylcrotonoyl chloride. In a similar manner, 2-benzylallyl bromide, 3,3-dibenzylallyl chloride, 1,3-di-2-[phenyl]ethylallyl chloride, 1,2,3-tri-[3-phenyl]butylallyl chloride react according to this process to yield the corresponding acyl halides.

Allylic halides containing unsaturated aliphatic radicals can be employed in this process. Preferred compounds of this type do not contain conjugated double bonds. Illustrative but non-limiting examples of this type of reactant include 3-but-3-enylallyl bromide, 2-[2-methyl]-but-3-enylallyl bromide, and the like. Similar alkenyl radicals having up to about 13 carbon atoms can also be employed in this process.

Aryl substituted allylic halides can also be employed. As an example, 3-phenylallyl chloride reacts with carbon monoxide at a pressure of 5,000 p.s.i. in hexane and in the presence of a catalytic amount of 10 percent rhodium on bentonite at 120° C. to yield 3-phenylvinylacetyl chloride and 3-phenylcrotonoyl chloride. In a similar manner, 1-phenylallyl bromide, 1,1-diphenylallyl bromide, 2-phenylallyl chloride, 3,3-diphenylallyl chloride, 1,2,3-triphenylallyl bromide, and the like, react to yield the corresponding acyl halides.

Alkaryl substituted allylic halides are applicable in the process of this invention. Thus, 3-o-tolylallyl chloride reacts at 100° C. with carbon monoxide at a pressure of 5,000 p.s.i. in the presence of hexane (as a liquid reaction medium) and a catalytic amount of palladium chloride to yield 3-o-tolyl vinylacetyl chloride and 3-o-tolylcrotonoyl chloride. Likewise, 3-[1,3,5-tri-tert-butyl]phenylallyl chloride, 2-[1,3,5-tri-tert-butyl]phenylallyl chloride, 1-[1,3,5-tri-tert-butyl]phenylallyl chloride, 1-[2-heptyl]phenylallyl bromide, 3,3-di-[3-ethyl]phenylallyl bromide, 3,3-di-[3-butyl]phenylallyl chloride, and the like, react to yield the corresponding acyl halides.

Other allylic halides can also be employed in this process. For example, the allylic group may be partially or totally within a cyclic system. For example, the compounds

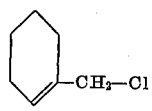 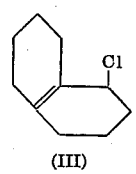

(II)          (III)

yield the corresponding acyl halides when reacted according to the process of this invention.

The hydrocarbon radicals bonded to the allylic group in the above compounds can be substituted with non-hydrocarbon radicals provided that the non-hydrocarbon substituents are stable under the reaction conditions employed and do not enter into competitive side reactions. Hence, the radicals $R_1$, $R_2$, $R_3$, $R_4$, and $R_5$ in Formula I can be substituted with radicals selected from the class consisting of fluoro, chloro, bromo, cyano, diethylamino, carbonyl, carboalkoxy, aldehydo, alkoxy, aryloxy, N,N-diethylamido, and the like. Preferably, the non-hydrocarbon substituents are bonded to a carbon atom which is not adjacent to a carbon atom within the allyl group.

The variety of allylic halides applicable in this process demonstrates that the process of this invention is substantially a reaction involving the allylic group,

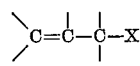

(wherein X is halogen), and the radicals bonded to the allyl group are not involved except to direct the position of substitution. Primarily because of their greater availability, allylic halides of Formula I, wherein $R_3$, $R_4$, and $R_5$ are hydrogen, are preferred. The most preferred allylic halides are allyl chloride and allyl bromide.

The products of this invention are either solids or liquids at room temperature and can be isolated from the reaction mixture by any method known in the art. Thus, the products can be isolated by distillation, extraction, fractional crystallization, salting out, chromatography, and other similar methods. In many instances it is convenient to isolate the products after transformation to the corresponding carboxylic acid, amide, or ester.

To isolate the products as the corresponding carboxylic acids, the filtered reaction mixture is treated with an aqueous alkaline solution. The liquid layers are separated and the aqueous phase is then neutralized with acid (preferably an inorganic acid such as hydrochloric or sulfuric acid). In many instances the product is insoluble in the acidified solution and precipitates. The last traces of product can be isolated from the aqueous layer (after precipitation) by extraction with an organic solvent.

A convenient method for isolating the products as the corresponding amide comprises treating the filtered reaction medium with gaseous ammonia. After removal of the precipitated ammonium chloride, the reaction medium is then concentrated by distillation. In some instances, some of the amide precipitates during this step. Generally, most of the amide product is isolated from the concentrated reaction medium by addition of a liquid in which the amide is insoluble. A suitable liquid of this type is kerosene or petroleum ether and the like.

Another preferred separation technique comprises the isolation of the product as a lower alkyl ester such as the methyl ester. In this embodiment, the filtered reaction mixture containing the acid halide product is treated with an alcohol (usually under reflux) or an alcoholic solution of an active metal alcoholate to form the ester. The ester product thus formed can then be isolated from the reaction mixture by any suitable technique such as distillation or chromatography.

The following non-limiting examples further illustrate the process of this invention. In the examples, all parts are by weight unless otherwise noted.

*Example 1*

A mixture of 153 parts of allyl chloride, 20 parts of 5% palladium on charcoal, and 440 parts of benzene was charged to a stainless steel autoclave. The system was purged with carbon monoxide. Thereafter, the pressure vessel was pressured with 3000 pounds of carbon monoxide. The mixture was stirred at 125° C. for 13 hours.

After cooling, the pressure vessel was vented and the contents discharged. The reaction mixture was filtered and 21 parts of solid residue was obtained. The filtrate was treated with approximately 500 parts of a 33% potassium carbonate aqueous solution. The aqueous solution was added slowly with stirring. A large quantity of carbon dioxide was evolved and the reaction was cooled with ice. The resultant layers were stirred at 25° C. for 16 hours.

The aqueous layer was separated from the organic layer and washed with diethyl ether. The aqueous layer was then acidified and extracted four times with 178-part portions of diethyl ether. The combined ether extractions were dried and the ether removed by distillation. Ninety-five parts of crude acid was obtained.

The crude acid was distilled and a fraction, 47 parts, B.P. 163–169° C., was obtained. This fraction was identified as vinylacetic acid (3-butenoic acid) by infrared spectrophotometry. Two successive fractions, B.P. 170–171° C. and 171–173° C. (total weight 25 parts), were identified by infrared spectrophotometry to contain mostly trans-crotonic acid. The yields of vinylacetic and trans-crotonic acid were 27% and 15% respectively.

*Example 2*

A mixture of 153 parts of allyl chloride, 20 parts of 5% palladium on charcoal, and 440 parts of benzene was charged to a stainless steel autoclave. After purging, the reaction vessel was pressured with 2000 lbs. of carbon monoxide. The mixture was stirred at 125° C. for one and one-quarter hours, then heated to 150° C. and maintained at that temperature for five hours, and then cooled. The reaction mixture was allowed to stand over the weekend.

The resultant reaction mixture was filtered and then hydrolyzed with 500 parts of a 20% sodium hydroxide aqueous solution. After neutralization and ether extraction as in Example 1, 126 parts (73%) of crude acid was obtained.

The crude acid was distilled and yielded 87 parts (51%) of cis- and trans-crotonic acid. The crude acid was recrystallized from ligroin. The recrystallized product was identified as trans-crotonic acid by infrared spectrophotometry and a mixed melting point with authentic trans-crotonic acid.

*Example 3*

A mixture of 153.06 parts of allyl chloride, 440 parts of benzene, and 10 parts of 5% palladium on charcoal was charged to a suitable pressure vessel. The vessel was flushed with carbon monoxide and then pressured to 2000 p.s.i.g. with carbon monoxide. The reaction mixture was heated at 125° C. for four hours. During this period, a pressure drop of 550 p.s.i.g. was observed. After cooling and venting, the contents of the vessel were discharged to a suitable reaction vessel. The vessel was rinsed with 261 parts of benzene and the rinse was added to the reaction mass.

The mixture was filtered and then made basic by dropwise addition of 140 parts of sodium hydroxide dissolved in 400 parts of water. During the addition, the mixture was maintained at about 20° C. by external cooling with a wet ice bath.

The aqueous layer was separated and acidified with sulfuric acid (1.75 moles required). Thereafter, the acidified mixture was extracted three times with 213-part-fractions of diethyl ether. The extracts were combined and dried under anhydrous magnesium sulfate. The ether was then removed by distillation.

The residue remaining after removal of the ether was distilled. A fraction boiling at 110° C. at 100 mm. Hg having a refractive index of 1.42222 $n_D^{21}$ was obtained. This fraction was substantially pure vinylacetic acid. A second fraction consisting of trans-crotonic acid was obtained; B.P. 111° to 83° C. at 100–15 mm. Hg.

The total amount of acid recovered was 108.2 parts which was equivalent to 62.9% yield. Of this, 86.8% was vinylacetic acid.

*Example 4*

The procedure of Example 3 was followed except that 340 parts of n-heptane was substituted for benzene. The resultant reaction mixture was treated with base and the aqueous layer separated from the organic layer. Distillation of the organic layer yielded 73 parts of unreacted allyl chloride. Sixty-two parts of crude acid was obtained from the aqueous layer after acidification and work-up as in the previous example. Distillation of the crude acid yielded 46.9 parts of vinylacetic acid and 10.14 parts of transcrotonic acid. Of the total acid recovered, 83.3% was vinylacetic acid and 16.7% was crotonic acid.

*Example 5*

A mixture of 551.9 parts of allyl chloride and 10 parts of 5% palladium on charcoal was charged to a pressure vessel. After flushing with carbon monoxide, the vessel was pressured to 3000 p.s.i.g. with carbon monoxide. The contents were heated to 125° C. and the pressure dropped from 2775 to 2100 p.s.i.g. during a four-hour period. The vessel was repressured to 3000 p.s.i.g. with carbon monoxide and during the next two hours, the pressure dropped to 2625 p.s.i.g. After cooling and venting, the vessel was discharged. The crude product was evaporated under vacuum and 396 parts of crude acid chloride was obtained.

The crude acid chloride was distilled through a three-foot helices-packed column. Of the product obtained, 83.9 percent was vinylacetyl chloride. The balance was trans-crotonoyl chloride.

*Example 6*

The procedure of Example 4 was followed except that the reaction time was extended to sixteen hours. Work-up of the reaction mixture and distillation yielded 97.68 parts of acid. Of this, 67.78 parts (69.4%) was vinyl-acetic acid and the balance, 29.9 parts, was trans-crotonic acid.

*Example 7*

A mixture of 153 parts of allyl chloride, 2.1 parts of palladium chloride, 440 parts of benzene, and 3000 p.s.i.g. of carbon monoxide in a suitable reaction vessel was heated to 115° C. When that temperature was reached, a rapid carbon monoxide uptake was observed. After one and one-half hours, the pressure had decreased 400 p.s.i.g. The reaction vessel was cooled and vented and the resultant solution collected. Filtration yielded 0.15 part of a brown residue. The residue turned black on standing overnight.

The filtrate was hydrolyzed with 1000 parts of 20% sodium carbonate. An additional 50 ml. of 50% sodium hydroxide was then added.

The resultant basic layer was acidified and extracted with ether as in the previous examples. Upon removal of the ether, 155 grams of crude acid was obtained.

The crude acid was distilled and 134 parts (78%) of vinylacetic acid, B.P. 92° C./40 mm. Hg, was obtained.

*Example 8*

A mixture of 182 parts of 3-methylallyl chloride (crotyl chloride), 10 parts of 5% palladium on charcoal, 440 parts of benzene, and 3000 p.s.i.g. of carbon monoxide was heated and stirred at 125° C. for four and one-half hours in a suitable reaction vessel. The resultant reaction mixture was filtered and hydrolyzed with 1000 parts of a 20% aqueous solution of sodium carbonate. Acidification, extraction, and removal of solvent as in the previous examples yielded 139.8 parts (70%) of a pentenoic acid; B.P. 92° C./25 mm. Hg. A ten-part-portion of the acid was catalytically reduced with hydrogen and platinum to yield n-valeric acid which was identified by infrared spectrophotometry.

*Example 9*

One mole of 1-methylallyl chloride and 30 moles of carbon monoxide are reacted in the presence of benzene and 3% palladium on alumina at 125° C. according to the procedure of Example 1.

After cooling, the pressure vessel is vented and the contents discharged. The resultant reaction mixture is filtered and the solid palladium-containing residues are recharged to a pressure vessel and the reaction repeated. The product is a mixture of 3-methylvinylacetic acid and 3-methylcrotonic acid.

Similar results are obtained when 2% palladium on diatomaceous earth, 7% palladium on bentonite, 9% palladium on firebrick, 10% palladium on kaolin, 3% palladium on ground glass, and 9% palladium on silicon carbide are employed. Similar results are obtained when 30 moles of allyl chloride are contacted with one mole of carbon monoxide.

*Example 10*

The process of Example 1 is repeated except that 15 parts of allyl palladium chloride is substituted for palladium on charcoal. The product is a mixture of vinylacetic acid and crotonic acid.

*Example 11*

A glass-lined stainless steel reaction tube, approximately 50 cm. in length, is packed with silicon carbide beads having 7% by weight of palladium chloride dispersed thereon. A thermal couple is placed in the packing and attached to temperature indicating means outside of the reaction tube. The tube is connected to heating means.

An inlet tube is fitted to the reaction tube. The inlet tube is connected to a source of allyl chloride vapor and a source of carbon monoxide. The inlet tube is fitted with pressure indicating means downstream from the allyl chloride and carbon monoxide sources.

The downstream end of the reaction tube is fitted with discharge means connected to a heat exchanger. The heat exchanger is connected to a receiving vessel. The receiving vessel is fitted with venting means to release unreacted gases and vapors. The vessel is also fitted with a product outlet.

Means for heating the vaporous allyl chloride and a flow metering device are located between the allyl chloride source and the inlet tube. The source of carbon monoxide comprises a container of carbon monoxide under pressure fitted with outlet means, means for heating the stream of carbon monoxide, a pressure regulating valve, and a flow metering device.

The reaction tube is heated to 300° C. The flow of allyl chloride vapors and carbon monoxide is initiated and the vapors and carbon monoxide gas are heated to 300° C. The relative amounts of carbon monoxide and allyl chloride vapors are regulated so that an approximately equivalent amount of these materials are introduced into the reaction tube.

During the passage of the reactant materials through the reaction zone, a mixture of vinylacetyl chloride and crotonyl chloride is formed. This mixture and the unreacted gases leave the reaction tube and enter the heat-exchange vessel whereby the product is liquified. The liquified product and the unreacted gases then pass to the receiving vessel. The unreacted gases are vented from the receiving vessel and, at intervals, the liquid product is removed therefrom.

*Example 12*

A glass-lined, 250 ml., pressure vessel is charged with 150 parts of allyl chloride and 3 parts of palladium chloride. After flushing the vessel twice with carbon monoxide, the vessel is pressured to 250 p.s.i.g. with that gas. The vessel and contents are rocked for 48 hours.

During that period the pressure is maintained between 50–60 p.s.i.g. by the addition of additional carbon monoxide. After the reaction period, the vessel is cooled and vented. Benzene, 100 parts, is added to the reaction mixture. The resultant mixture is filtered and treated as in Example 1. A mixture of vinylacetic acid and crotonic acid is obtained.

Example 13

A mixture of 130 parts of 2-methylallyl bromide, 900 parts of n-hexane, and 10 parts of palladium bromide are charged to a suitable reaction vessel. The vessel is pressured with 1000 p.s.i.g. of carbon monoxide. Treatment of the resultant reaction mixture as in Example 1 yields a mixture of 2-methylvinylacetic acid and 2-methylcrotonic acid.

The reaction is repeated using 1,2-dimethylallyl bromide in place of the 2-methylallyl bromide. The product is a mixture of 2,3-dimethylvinylacetic acid and 2,3-dimethylcrotonic acid.

Example 14

A mixture of 440 parts of benzene, 155 parts of allyl chloride, and 20 parts of 5% palladium on charcoal was charged to a suitable pressure vessel. The vessel was flushed twice with ethylene and then saturated with 500 p.s.i.g. of ethylene. The pressure was increased to 1500 p.s.i.g. with carbon monoxide and the resultant mixture heated to 150° C. Upon attaining that temperature, the pressure was 4000 p.s.i.g. The pressure decreased almost 400 p.s.i.g. during the first hour. At that time, an additional 500 p.s.i.g. of ethylene and 1800 p.s.i.g. of carbon monoxide were introduced. The pressure dropped 900 p.s.i.g. over the next three hours. Five-hundred p.s.i.g. of ethylene and 1900 p.s.i.g. of carbon monoxide were then added. After an additional two and one-half hours, the pressure drop was 400 p.s.i.g. The reaction vessel was cooled, vented, and discharged.

The resultant reaction mixture was divided into two equal fractions. One fraction was extracted with aqueous sodium hydroxide. After acidifying the aqueous layer, the base extract was extracted with diethylether. Removal of the ether yielded 80 parts of crude acid. Fractional crystallization of the crude acid demonstrated that it was a mixture of crotonic and vinylacetic acids.

Example 15

A mixture of 154 parts of allyl chloride, 1000 parts of benzene, and 5 parts of palladium chloride is charged to a suitable pressure vessel. The vessel is flushed with carbon monoxide and then pressured to 5000 p.s.i.g. with additional carbon monoxide. The resultant reaction mixture is stirred and heated to 100° C. and maintained at that temperature with stirring for four hours. After cooling and venting, the vessel is discharged.

The resultant reaction mixture is filtered and the filtrate divided into two equal portions. Ammonia gas is bubbled into one portion for three hours. The white precipitate which is formed is removed by filtering the resultant mixture at 75° C. The filtrate is concentrated by distillation. Petroleum ether is added to the filtrate and a mixture of vinylacetamide and crotonamide is obtained.

The second portion of the original filtrate is added to 1000 parts of dry methanol and the resultant mixture heated under reflux for ten hours. Fractional distillation of the resultant mixture yields a mixture of methyl vinylacetate and methyl crotonate.

Substitution of ethanol for the methanol employed above results in the formation of the corresponding ethyl esters.

The reactions listed in the following table further illustrates the process of this invention. Substitution of $$K_2Pd^{II}(C_2O_4) \cdot 2H_2O$$

$$Na_3[Rh(C_2O_4)_3] \cdot 6H_2O$$

$$K_3[Rh(malonato)_3] \cdot 5H_2O$$

tris(ethylenediamine) rhodium$^{III}$, and palladium (II) dimethylglyoximate, for palladium chloride employed in the reaction described in Example 16, yields the same product.

TABLE 1

| Ex. | Allylic Halide | Solvent | Catalyst | Carbon Monoxide Pressure | Temperature, °C. | Time, hrs. | Product(s) |
|---|---|---|---|---|---|---|---|
| 16 | 1-chloro-2-heptene | Benzene | PdCl₂ | 1,500 | 140 | 3 | 3-octenoic acid chloride. / 2-octenoic acid chloride. |
| 17 | 3-cyclohexylallyl chloride | Mixed xylenes | 5% palladium on charcoal. | 5,000 | 160 | 5 | 4-cyclohexyl-but-3-eneoic acid chloride. / 4-cyclohexyl-but-2-eneoic acid chloride. |
| 18 | Cinnamyl chloride | Benzene | PdCl₂ | 2,000 | 120 | 4 | 4-phenyl-but-3-eneoic acid chloride. / 4-phenyl-but-2-eneoic acid chloride. |
| 19 | 1-chloro-2,4-hexadiene | Toluene | PdCl₂ | 1,000 | 120 | 4 | 3,5-heptadienoic acid chloride. |
| 20 | 1-chloro-2-hexene-5-one | Benzene | 10% palladium on charcoal. | 500 | 175 | 4 | 6-keto-hept-3-eneoic acid chloride. / 6-keto-hept-2-eneoic acid chloride. |
| 21 | 3-(p-ethylphenyl) allyl chloride. | do | 8% palladium on charcoal. | 4,000 | 160 | 5 | 4-(p-ethylphenyl)-but-3-eneoic acid chloride. / 4-(p-ethylphenyl)-but-2-eneoic acid chloride. |
| 22 | 1,3-dimethylallyl chloride | do | RhCl₃ | 3,000 | 300 | ½ | 2-methyl-pent-2-eneoic acid chloride. |
| 23 | 2,3-dimethylallyl chloride | do | 20% palladium on charcoal. | 2,000 | 125 | 4 | 3-methyl-pent-3-eneoic acid chloride. / 3-methyl-pent-2-eneoic acid chloride. |
| 24 | Crotyl chloride | Heptane | 5% rhodium on charcoal. | 4,000 | 200 | 2 | Pent-2-eneoic acid chloride. / Pent-3-eneoic acid chloride. |
| 25 | 1,2-dimethylallyl chloride | Benzene | PdCl₂ | 2,000 | 140 | 6 | 3-methyl-pent-3-eneoic acid chloride. / 3-methyl-pent-2-eneoic acid chloride. |

A preferred embodiment for the preparation of the esters (derived from the acyl halides prepared by the process of this invention) comprises carrying out the process in the presence of an ether. Although not bound by any theory, it is believed that, under the conditions of the process, the ether is cleaved to form an alkoxide fragment which reacts with the acyl halide produced to prepare the corresponding ester. Thus, a preferred embodiment of this invention comprises a catalytic process for the preparation of an ester of an unsaturated carboxylic acid having at least four carbon atoms, said process comprising reacting an allylic halide having up to about 20 carbon atoms with carbon monoxide under pressure and in the presence of an ether and a catalytic quantity of a catalyst selected from the class consisting of palladium metal, rhodium metal, and chelates and organic salts of said metals.

A preferred reaction comprises a catalytic process for the preparation of an ester of an unsaturated carboxylic acid having at least four carbon atoms, said process comprising reacting an allylic halide having the formula

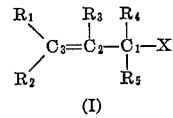

(I)

wherein X is a halogen, and $R_1$, $R_2$, $R_3$, $R_4$, and $R_5$ are independently selected from the class consisting of hydrogen and univalent organic radicals selected from the class consisting of alkyl, cycloalkyl, aralkyl, alkenyl, aryl, and alkaryl radicals having up to about 13 carbon atoms, such that the number of carbon atoms in said allylic halide does not exceed about 20; with carbon monoxide under pressure and in the presence of an ether and a catalytic quantity of a catalyst selected from the class consisting of palladium metal, rhodium metal, and chelates and inorganic salts of said metals; and in the presence of saturated ether. The allylic halides and chelates hereinbefore described and illustrated, are applicable in this embodiment. The same reaction conditions (pressure, temperature, and time) are employed.

A wide variety of ethers can be employed in this embodiment. Thus, any ether which does not contain substituent groups which hinder or retard the process by undergoing competitive side reactions are applicable. Typical ethers of this type are the saturated ethers. Preferred ethers contain only one ethereal oxygen atom.

Symmetrical ethers are preferred so that the structure of the ester product will be unequivocal. If the radicals bonded to the ethereal oxygen atom are not identical, the one which more readily forms an alkoxide radical will, in general, react with the acid halide to form the corresponding ester. In most instances, at least a small amount of both possible products is formed. Illustrative but non-limiting examples of preferred ethers include diethylether, diisopropylether, di-n-butylether, di-n-hexylether, di-(β-chloroethyl)ether, tetrahydrofuran, and the like.

The following examples in which all parts are parts by weight more fully illustrate this embodiment.

*Example 26*

A mixture of 153.06 parts of allyl chloride, 355 parts of diethylether, and 10 parts of 10% palladium on charcoal was charged to a suitable reaction vessel. The contents were reacted with carbon monoxide as in Example 3.

The crude reaction mixture was filtered to remove the catalyst and charged to a suitable reaction vessel. The crude mixture was made basic by the dropwise addition of 140 parts of sodium hydroxide dissolved in 400 parts of water. During the addition, the reaction mixture was maintained at about 20° C. by externally cooling the reaction vessel with a wet ice bath.

The aqueous basic phase was separated and the neutral organic phase was distilled. The fraction boiling at 122–126° C. was collected. This fraction, 17.4 parts, was ethylvinyl acetate. The product was identified by its infrared spectrum and index of refraction.

The basic aqueous solution was allowed to stand at 25° C. for 16 hours before being acidified and extracted. Workup of this fraction as in Example 3 yielded 40.7 parts of vinylacetic acid and 33.4 parts of trans-crotonic acid.

*Example 27*

The procedure of Example 26 was followed except that 444 parts of tetrahydrofuran was employed in place of diethyl ether and the bulk of the tetrahydrofuran was stripped from the crude reaction mixture before treating the mixture with aqueous base. The stripped tetrahydrofuran was collected in Dry Ice-cooled traps and combined with the neutral portion after treating the mixture with aqueous base.

The neutral fraction-tetrahydrofuran mixture was distilled. A clear liquid fraction, 113 parts (B.P. 102° C./10 mm.–88° C./5 mm.) was obtained. This fraction gave a positive hydroxamic acid test for esters, a positive Beilstein test for halogen, and rapidly reduced cold dilute potassium permanganate solution. The infrared spectrum of this fraction had strong bands at 17.28 cm.$^{-1}$, 1635 cm.$^{-1}$, 988 cm.$^{-1}$, and 915 cm.$^{-1}$. The latter three bands are characteristic of terminal double bonds.

A thirty-part portion of the ester was saponified in a solution of 28 parts of potassium hydroxide dissolved in 158 parts of ethanol. A white precipitate formed when the fraction was added. The mixture was allowed to stand at 25° C. for 16 hours and was then boiled under reflux for two hours. Most of the ethanol was removed by distillation. After distillation the residue was treated with aqueous base and then acidified. A precipitate was obtained. After recrystallizing the precipitate from n-hexane, it was identified as trans-crotonic acid, M.P. 70.5–71.5° C., by its infrared spectrum.

The remaining ester was redistilled through a glass helices packed column and a fraction boiling at 118° C. and at 20 mm. Hg was collected. A sample of this fraction was analyzed. *Analysis.*—Calcd. for $C_8H_{13}O_2Cl$: C, 54.39%; H, 7.41%; Cl, 20.07%. Found: C, 54.40%; H, 7.52%; Cl, 20.5%. On the basis of the above evidence, the product was identified as an ester of vinylacetic acid wherein the alcoholic portion is a halogenated alkoxide radical derived by cleaving the tetrahydrofuran.

Another preferred embodiment of this invention comprises contacting the allylic halide and the catalyst with carbon monoxide in the presence of acetylene. Surprisingly, acetylene promotes the preparation of unsaturated carboxylic halides according to the process of this invention. Thus, a preferred process of this invention comprises a catalytic method for the preparation of an unsaturated carboxylic acid halide having at least four carbon atoms, said process comprising reacting an allylic halide free of acetylenic bonds and having up to about 20 carbon atoms, with carbon monoxide under pressure and in the presence of a catalytic quantity of a catalyst selected from the class consisting of palladium metal, rhodium metal, and chelates and organic salts of said metals, and in the presence of a promoter quantity of acetylene. A highly preferred method comprises a catalytic and promoted process for the preparation of an unsaturated carboxylic acid halide having at least four carbon atoms, said process comprising reacting an allylic halide having the formula

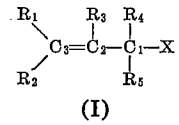

(I)

wherein X is a halogen, and $R_1$, $R_2$, $R_3$, $R_4$, and $R_5$ are independently selected from the class consisting of hydrogen and univalent organic radicals selected from the class consisting of alkyl, cycloalkyl, aralkyl, alkenyl, aryl, and alkaryl radicals having up to about 13 carbon atoms, such that the number of carbon atoms in said allylic halide does not exceed about 20; with carbon monoxide under pressure, and in the presence of a catalytic quantity of a catalyst selected from the class consisting of palladium metal, rhodium metal, and chelates and inorganic salts of said metals; and in the presence of a promoter quantity of acetylene. The allylic halides and chelates hereinbefore described and illustrated, are applicable in this embodiment. In general, the same reaction conditions are employed.

In general, a promoter quantity of acetylene is about one-tenth of the amount of the catalyst. Thus, from about 0.00001 mole percent of acetylene can be employed, but usually larger amounts, in the range of 0.001–0.5 mole percent, are used. There is no critical upper limitation. However, for safety and economic reasons, it is preferred that the smallest amount of acetylene necessary to promote the reaction be employed. The allylic halides and catalysts hereinbefore described and illustrated, are applicable in this embodiment. In general, the same reaction conditions are employed. However, the process can be conducted at a lower temperature. Thus, when preparing acyl halides according to this embodiment, temperatures as low as about 70° C. can be used. The following examples illustrate this embodiment.

*Example 28*

A mixture of 155 parts of allyl chloride, 20 parts of 5% palladium on charcoal, and 440 parts of benzene was charged to a reaction vessel. The system was flushed with carbon monoxide and then pressured with 200 p.s.i.g. of acetylene and 2000 p.s.i.g. of carbon monoxide. The temperature was raised to 75° C. Upon attaining that temperature, the pressure was 2800 p.s.i.g. After an hour and forty minutes, the pressure had decreased to 2625 p.s.i.g., a decrease of 175 p.s.i.g. The reaction mixture was maintained at 75° C. for a total of six and one-half hours. The final pressure was 2390 p.s.i.g.

The vessel was vented, cooled, and discharged. Workup of the filtered reaction mixture in this manner yielded 92 parts of vinylacetic acid.

The promoter effect of acetylene is apparent when the above reaction is compared with a similar reaction carried out in the absence of acetylene. Thus, when a reaction vessel was charged with a similar reaction mixture (without acetylene) and carried out at 100° C., the pressure drop over a one-hour-and-fifty-one-minute period was only 25 p.s.i.g.

*Example 29*

A mixture of 153 parts of allyl chloride, 20 parts of 5% palladium on charcoal, 440 parts of benzene, was charged to a reaction vessel. The vessel was flushed with carbon monoxide and 2000 p.s.i.g. of carbon monoxide was added. The temperature was raised to 75° C.; at that temperature the pressure was 2400 p.s.i.g. No decrease in pressure was noted after one hour. Thereafter, the clave was vented and repressed with 200 p.s.i.g. of acetylene and 2000 p.s.i.g. of carbon monoxide (26° C.). The temperature was raised to 75° C. The pressure correspondingly increased to 2625 p.s.i.g. After 50 minutes, the pressure was 2540 p.s.i.g., a decrease of 85 p.s.i.g. The temperature was maintained at 74-76° C. for 12 hours. Workup of the filtered reaction mixture in the usual manner yielded 110 parts of pure vinylacetic acid and 3 parts of crotonic acid.

Comparison of the lack of reduction in pressure in the above experiment when no acetylene was present with the decrease after acetylene had been added, demonstrates the promoter effect of acetylene. A similar promoter effect is noted when the process of Examples 28 and 29 are carried out at 70° C.

In a similar manner, acetylene accelerates the rate of reaction of carbon monoxide with 1-bromo-2-heptene, 3-cyclopentyl allyl chloride, cinnamyl bromide, p-methylcinnamyl chloride, 3(p-ethylphenyl)allyl bromide, and 1,3-diethylallyl chloride, in the presence of palladium or palladium chloride when the procedures of Examples 28 and 29 are followed. Since acetylene accelerates the rate of reaction, its use affords a decreased reaction time and, therefore, a more economical process.

Substitution of cyclopentadiene or other compounds having the general configuration of cyclopentadiene, for acetylene affords similar promoter effects. The use of a cyclomatic hydrocarbon as a promoter in this process is another preferred embodiment of this invention.

The cyclomatic hydrocarbon employed in this embodiment can be selected from four generic types of hydrocarbons, having up to about 13 carbon atoms, which have the configuration of cyclopentadiene. Hence, the cyclomatic hydrocarbon may be cyclopentadiene, $C_5H_6$, or a hydrocarbon substituted cyclopentadiene. Thus, applicable cyclomatic hydrocarbons include univalent hydrocarbon radical-substituted cyclopentadienes such as methylcyclopentadiene, tert-butylcyclopentadiene, phenylcyclopentadiene, cyclohexylethyl cyclopentadiene, and the like. The cyclopentadienyl ring may be polysubstituted such as in 3,4-dimethylcyclopentadiene, 2,5-di-isopropylcyclopentadiene, and the like. However, it is preferred that the total number of carbon atoms within the ring plus the number of carbon atoms in the substituent radicals be no higher than about 13.

The second type of cyclomatic hydrocarbon which is applicable as promoters in the process of this invention includes indene and univalent hydrocarbon radical substituted indenes such as 3,4-diethylindene, 3-phenylindene, and the like. The third type of applicable cyclomatic hydrocarbon is selected from the class consisting of fluorene and univalent hydrocarbon radical substituted fluorenes such as 3-butylfluorene, 4,5-dimethylfluorene, and the like. The fourth type of cyclomatic hydrocarbon can be represented by the general formula

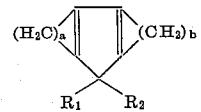

wherein $R_1$ and $R_2$ are independently selected from the class consisting of hydrogen and univalent hydrocarbon radicals. Illustrative examples of this type of cyclomatic hydrocarbon include 4,5,6,7-tetrahydroindene, 1,2,3,4,5,6,7,8-octahydrofluorene, 6-methyl-4,5,6,7-tetrahydroindene, and the like.

Thus, this embodiment of the invention is a catalytic and promoted process for the preparation of an unsaturated carboxylic acid halide having at least four carbon atoms, said process comprising reacting an allylic halide having up to about 20 carbon atoms, with carbon monoxide under pressure, and in the presence of a catalytic quantity of a catalyst selected from the class consisting of palladium metal, rhodium metal, and chelates and inorganic salts of said metals; and in the presence of a promoter quantity of a cyclomatic hydrocarbon having from 5 to about 13 carbon atoms. A preferred method is a catalytic and promoted process for the preparation of an unsaturated carboxylic acid halide having at least four carbon atoms, said process comprising reacting an allylic halide having the formula

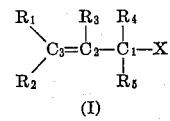

(I)

wherein X is a halogen, and $R_1$, $R_2$, $R_3$, $R_4$, and $R_5$ are independently selected from the class consisting of hydrogen and univalent organic radicals selected from the class consisting of alkyl, cycloalkyl, aralkyl, alkenyl, aryl, and alkaryl radicals having up to about 13 carbon atoms, such that the number of carbon atoms in said allylic halide does not exceed about 20; with carbon monoxide under pressure and in the presence of a catalytic quantity of a catalyst selected from the class consisting of palladium metal, rhodium metal, and chelates and inorganic salts of said metals; and in the presence of a promoter quantity of a cyclomatic hydrocarbon having from 5 to about 13 carbon atoms.

The allylic halides and catalysts hereinbefore described and illustrated are applicable in this embodiment. The same reaction conditions are employed. In general, the amount of cyclomatic hydrocarbon employed is equal to the amount of acetylene defined above. The following example illustrates this embodiment.

*Example 30*

A mixture of 153 parts of allyl chloride, 10 parts of freshly distilled cyclopentadiene, two parts of palladium chloride, and 440 parts of benzene, was charged to a pressure vessel. The vessel was pressured with 3000 p.s.i.g. of carbon monoxide (at 15° C.) and the resultant mixture stirred and heated to 80° C. After two hours, the pressure had decreased 50 p.s.i.g. and the temperature was increased to 100° C. A rapid uptake ensued. After two hours, the uptake had ceased and the pressure had dropped 400 p.s.i.g. The vessel and contents were cooled to 19° C. Treatment of the resultant reaction mixture as in Example 1 yielded 136 parts of a mixture of vinylacetic and crotonic acids.

Under similar conditions, but without cyclopentadiene, the pressure drop, at 100° C. over an approximate two-hour span, was only about 100 p.s.i.g. This demonstrates the promoter effect of cyclopentadiene. Thus, the presence of cyclopentadiene affords a shorter reaction time and, therefore, a more economical process.

Similarly, the reaction time is shortened if methylcyclopentadiene, n-octylcyclopentadiene, indene, 3-methylindene, fluorine, and tetrahydroindene, are substituted for the cyclopentadiene employed in the above process. Following the procedure of Example 31, cyclopentadiene accelerates the rate of reaction of carbon monoxide with 1-bromo-2-heptene, 3-cyclopentylallyl chloride, cinnamyl bromide, p-methylcinnamyl chloride, 3-(p-ethylphenyl) allyl bromide, and 1,3-diethylallyl chloride, in the presence of palladium or palladium chloride.

Many of the unsaturated carboxylic halides (and the corresponding acids, esters, and amides) are well-known compounds. They have the many utilities which are known for those compounds. All of the unsaturated carboxylic acid halides, acids, esters, and amides produced by this process are valuable chemical intermediates. For example, they undergo many of the reactions known for unsaturated compounds. Hence, they can be brominated or chlorinated by addition of bromine or chlorine to the double bond. Similarly, they can be hydrobrominated by treatment with hydrobromic acid. Moreover, they can be reacted with hydrogen sulfide to yield carboxylic acids. Thus for example, two moles of vinylacetic acid react with one mole of hydrogen sulfide to yield $$(HOOC-CH_2-CH_2-CH_2)_2S$$

Having fully described the novel process of this invention and the many utilities of the products produced thereby, we desire to be limited only within the lawful scope of the appended claims.

We claim:
1. In a process for the preparation of an unsaturated carboxylic acid halide having at least four carbon atoms, which comprises reacting (1) an allylic halide having the formula

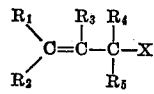

wherein X is a halogen, and $R_1$, $R_2$, $R_3$, $R_4$ and $R_5$ are independently selected from the class consisting of hydrogen and univalent organic radicals selected from the class consisting of alkyl, cycloalkyl, aralkyl, alkenyl, and aryl radicals having up to about 13 carbon atoms, such that the number of carbon atoms in said allylic halide does not exceed about 20; with (2) carbon monoxide under pressure and in the presence of (3) a catalytic quantity of a catalyst selected from the class consisting of palladium metal, rhodium metal and chelates and inorganic salts of said metals, the improvement which comprises carrying out said process in the presence of about 0.00001 to about 0.5 mole percent of a promoter selected from the class consisting of acetylene and cyclomatic hydrocarbons having from about 5 to 13 carbon atoms, said cyclomatic hydrocarbons being selected from the class consisting of
 (a) cyclopentadiene,
 (b) hydrocarbon substituted cyclopentadiene wherein said hydrocarbon substituent is selected from alkyl groups having 1 to about 6 carbon atoms and phenyl,
 (c) indene,
 (d) hydrocarbon substituted indene wherein said hydrocarbon substituent is selected from alkyl groups having 1 to about 6 carbon atoms and phenyl,
 (e) fluorene, and
 (f) hydrocarbon substituted fluorene wherein said hydrocarbon substituent is a $C_1$ to $C_4$ alkyl group.

2. The process of claim 1 wherein the promoter is cyclopentadiene.

3. The process of claim 1 wherein the promoter is acetylene.

4. The process of claim 2 wherein the quantity of promoter is from about 0.001 to about 0.5 mole percent.

5. The process of claim 3 wherein the quantity of promoter is from about 0.001 to about 0.5 mole percent.

References Cited

Chiusoli etl al.: "Zeitschrift für Naturforschung," vol. 17B (1962), page 850.

Fischer et al.: "Zeitschrift für Naturforschung," vol. 17B (1962), pp. 484–485.

Heck: "J. Am. Chem. Soc.," vol. 85 (1962), pp. 2013–2014.

Tsuji et al.: "Tetrahedron Letters," No. 26, pp. 1811–1813 (1963).

LORRAINE A. WEINBERGER, *Primary Examiner.*

RICHARD K. JACKSON, *Examiner.*